United States Patent [19]
Nomura et al.

[11] Patent Number: 5,274,413
[45] Date of Patent: Dec. 28, 1993

[54] MOUNT ASSEMBLY OF OPTICAL DEVICES

[75] Inventors: Katsuhiko Nomura; Kenichi Sakata; Hiroaki Takagi; Misao Ishikawa; Yasuo Nihei, all of Tokyo, Japan

[73] Assignee: Asahi Kogaku Kogyo Kabushiki Kaisha, Tokyo, Japan

[21] Appl. No.: 995,530

[22] Filed: Dec. 22, 1992

Foreign Application Priority Data

[30] Feb. 14, 1990 [JP] Japan ............... 2-33020

Related U.S. Application Data

[63] Continuation of Ser. No. 655,346, Feb. 14, 1991, abandoned.

[51] Int. Cl.⁵ .............................................. G03B 17/00
[52] U.S. Cl. ................................. 354/286; 359/828
[58] Field of Search ............... 354/286; 359/819, 827, 359/828, 829, 830

[56] References Cited

U.S. PATENT DOCUMENTS

| | | | |
|---|---|---|---|
| Re. 32,049 | 12/1985 | Okura et al. | 354/286 |
| 3,758,198 | 9/1973 | Kanie et al. | 359/828 |
| 4,357,089 | 11/1982 | Okura et al. | 354/286 |
| 4,390,263 | 6/1983 | Sumita | 354/286 |
| 4,653,889 | 3/1987 | Haneishi | 354/286 |
| 4,669,846 | 6/1987 | Koch et al. | 354/295 |
| 4,939,532 | 7/1990 | Takebayashi | 354/286 |

FOREIGN PATENT DOCUMENTS

| | | |
|---|---|---|
| 56-158327 | 12/1981 | Japan . |
| 57-202510 | 12/1982 | Japan . |
| 931887 | 7/1963 | United Kingdom . |
| 998197 | 7/1965 | United Kingdom . |
| 2010512 | 6/1979 | United Kingdom . |
| 2012060 | 7/1979 | United Kingdom . |

Primary Examiner—Michael L. Gellner
Assistant Examiner—Howard B. Blankenship
Attorney, Agent, or Firm—Sandler Greenblum & Bernstein

[57] ABSTRACT

A mount assembly having mounts which are provided on optical devices to be detachably attached to each other and which have mount surfaces which come into contact with each other when the optical devices are attached to each other through the mounts, wherein at least one of the mounts includes in combination a mount body which is made of synthetic resin and which is provided with the mount surface and a reinforcing metal ring member.

10 Claims, 9 Drawing Sheets

MOUNT ASSEMBLY OF OPTICAL DEVICES

This application is a continuation of application Ser. No. 07/655,346 filed Feb. 14, 1991, now abandoned.

BACKGROUND OF THE INVENTION

1. Field of the Invention

The present invention relates to a mounting mechanism for mounting an optical device, such as a camera body, an interchangeable lens, various converters, an intermediate ring, a diaphragm device, or other similar optical devices.

2. Description of the Related Art

A bayonet mount is usually incorporated in such a mounting mechanism. The bayonet mount usually has a male mount (e.g., a lens mount of a single-lens reflex camera) and a female mount (e.g., a body mount of a camera), provided on a pair of optical devices to be attached to each other. The male and female mounts are provided with a plurality of teeth which can be engaged with each other when the mounts are fitted and rotated relative to each other. When the male and female mounts are engaged, the mount surfaces of the opposed mounts are brought into pressure-contact with each other with the help of a spring.

The mount member is usually made of metal so as to ensure that it is sufficiently strong and can be precisely machined. However, since the mount member has a complicated contour, it requires a large number of complex machining steps. In addition, the mount surfaces of the mount members must be subjected to a surface treatment for anti-scuffing, for preventing the surfaces from being damaged due to sliding contact between the metal surfaces, and for providing a smooth fit during the relative sliding rotation of the mount members. Furthermore, in cases where the mount surfaces have electrical contacts thereon, it is necessary to provide insulating means for the electrical contacts. Consequently, the mount is one of the most expensive camera components. Furthermore, the fit upon attachment and detachment of the mount members deteriorates in time due to wear of the metal surfaces, even if the surfaces are subject to a surface treatment as mentioned above or a lubricating surface treatment.

SUMMARY OF THE INVENTION

The primary object of the present invention is to provide a mount which can be inexpensively and precisely manufactured and which has sufficient strength, high wear-resistance, high anti-corrosion properties, and an improved fit.

To achieve the objects mentioned above, according to the present invention, a mount assembly is provided having mounts which are provided on optical devices to be detachably attached to each other and which have mount surfaces which come into contact with each other when the optical devices are attached to each other through the mounts, wherein at least one of the mounts comprises, in combination, a mount body which is made of synthetic resin and which is provided with the mount surface and a reinforcing metal ring member for reinforcing the mount body.

Since it is easy to make a complicated shape precisely in an injection molding machine using synthetic resin, no precise machining is necessary.

The decreased strength due to synthetic resin can be reinforced by the reinforcing metal ring member. No high precision of the machining of the reinforcing ring member is necessary. Specifically, in the mount assembly according to the present invention, precision shapes are ensured by forming the mount body of synthetic resin, and strength is increased by using a reinforcing ring member made of metal.

The reinforcing ring member can be embedded in the mounting body of synthetic resin, or can be made of a separate piece which can be fitted and secured to the mount body together with the mount body.

The reinforcing metal ring member can be used as an electrical conductor. On the other hand, the mount body of synthetic resin can be used as an insulating member. To this end, for instance, the grounding member provided on the mount surface is brought into contact with the reinforcing ring member and the contact pin provided on the mount surface is not brought into contact with the reinforcing ring member.

Preferably, the mount body of synthetic resin is made of engineering plastic which can be injection-molded, such as polyphenylenesulfite or liquid crystal polymer. Alternatively, it is also possible to make the mount body of, e.g., a self-lubricating resin or oil-impregnated resin.

The present invention can be applied to at least one of the mount members to be attached to each other. In this case, the other mount member can be made of metal while maintaining desired sliding characteristics.

According to another aspect of the present invention, a camera system is provided having a camera body with a female mount and an interchangeable lens having a male mount which can be engaged by the female mount of the camera body, wherein at least one of the male and female mounts comprises, in combination, a mount body which is made of synthetic resin and which comes into contact with the other mount, and a reinforcing metal ring member which does not come into contact with the other mount.

Preferably, the male mount of the interchangeable lens is made of metal.

The present disclosure relates to subject matter contained in Japanese patent application No. 2-33,020 (filed on Feb. 14, 1990), which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

The illustrated embodiments are applied to a body mount 20 of a camera body 11 to which a lens mount 14 of an interchangeable lens 12 is detachably attached. In the illustrated embodiments, the lens mount is made of metal.

Figure 9:
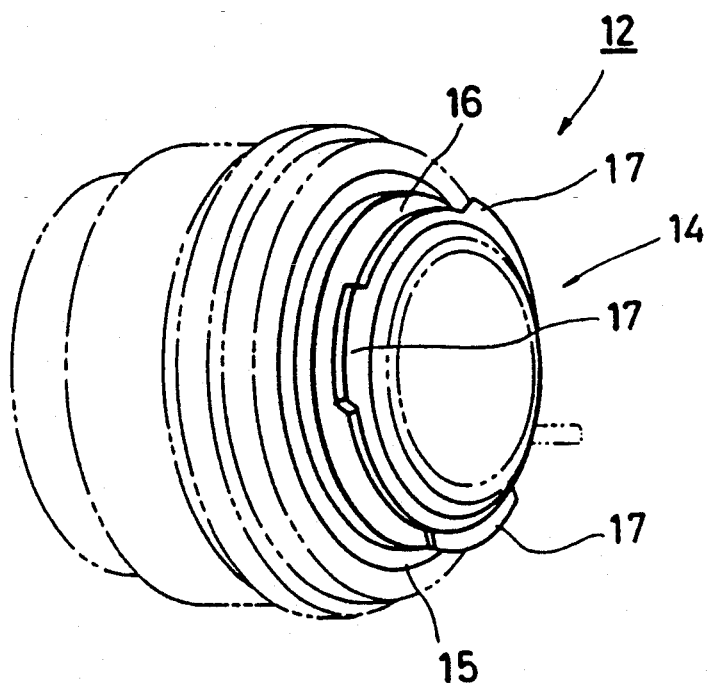

The lens mount 14, which is generically shown in FIG. 9, has a mount surface 15, an annular groove 16 located behind the mount surface 15, and claws (projections) 17 of predetermined shapes which are spaced apart from one another at a predetermined distance and which project radially and outwardly.

In the first embodiment shown in FIGS. 1 through 5, the body mount 20 has a mount body 21 made of synthetic resin, a reinforcing ring member (metal ring member) 22, and an elastically deformable ring member 23.

The mount body 21 has a mount surface 21a which comes into contact with the mount surface 15 of the interchangeable lens 12, recesses 21c through which the radial projections 17 of the interchangeable lens 12 can enter, and radial claws (projections) 21d which are adjacent to the recesses 21c and which are placed on the front surfaces of the projections 17 when the interchangeable lens 12 is attached. The mount body 21 also has insertion holes for set screws 24, an AF joint 25, a grounding pin 26, contact pins 27 and a lock pin 28.

The components of the mount body 21 can be precisely formed on the mount body by injection molding synthetic resin. A synthetic resin, of which the mount body 21 is made, can preferably be an engineering plastic which can be used in an injection molding process, such as polyphenylenesulfite (PPS), liquid crystal polymer, or self-lubricating resin or oil-impregnated resin.

The reinforcing ring member 22 is inserted and molded in the mount body 21. The reinforcing ring member 22 has insertion holes for the set screws 24, the AF joint 25, the grounding pin 26, the contact pin 27, and the lock pin 28, similar to the mount body 21. The insertion hole 22a of the reinforcing ring member 22, in which the contact pin 27 is loosely inserted with a clearance therebetween, is disguised so that the contact pin 27 is insulated from the insertion hole 22a. On the other hand, the grounding pin 26 is brought into contact with the reinforcing ring member 22.

Figure 5:
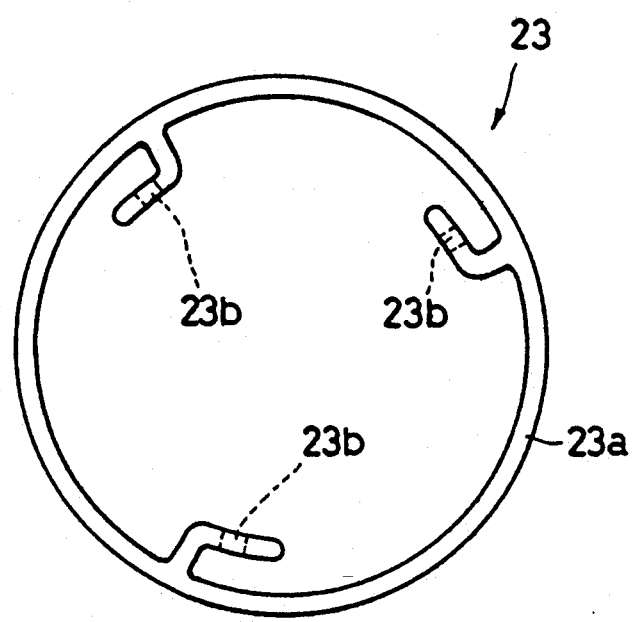
FIG. 5 is a plan view of a single elastic ring used in the present invention.

The elastically deformable ring member (annular spring member) 23 has an annular body 23a and spring portions 23b which extend from the annular body 23a and bend into a predetermined shape to correspond to the teeth 21d of the mount body 21, as shown in FIG. 5. Each of the spring portions 23b has a raised portion projecting parallel to the the optical axis direction to elastically press the teeth 17 of the interchangeable lens 12 rearwardly to thereby bring the mount surface 21a of the mount body 21 into close contact with the mount surface 15 of the lens mount 14.

The annular body 23a of the annular spring member 23 is superimposed on the inner peripheral surface portion of the mount body 21 and is secured to the camera body 30. Specifically, the mount body 21 in which the reinforcing ring member 22 is embedded, and the spring member 23, are secured to the camera body 30 by the set screws 24. The AF joint 25, the grounding pin 26, the contact pin 27 and the lock pin 28, etc., are inserted into respective insertion holes. The heads of the set screws 24 are directly in contact with the reinforcing ring member 22, so that the mount body 21 is prevented from being damaged at the contact portions with the set screws 24.

Figure 8:
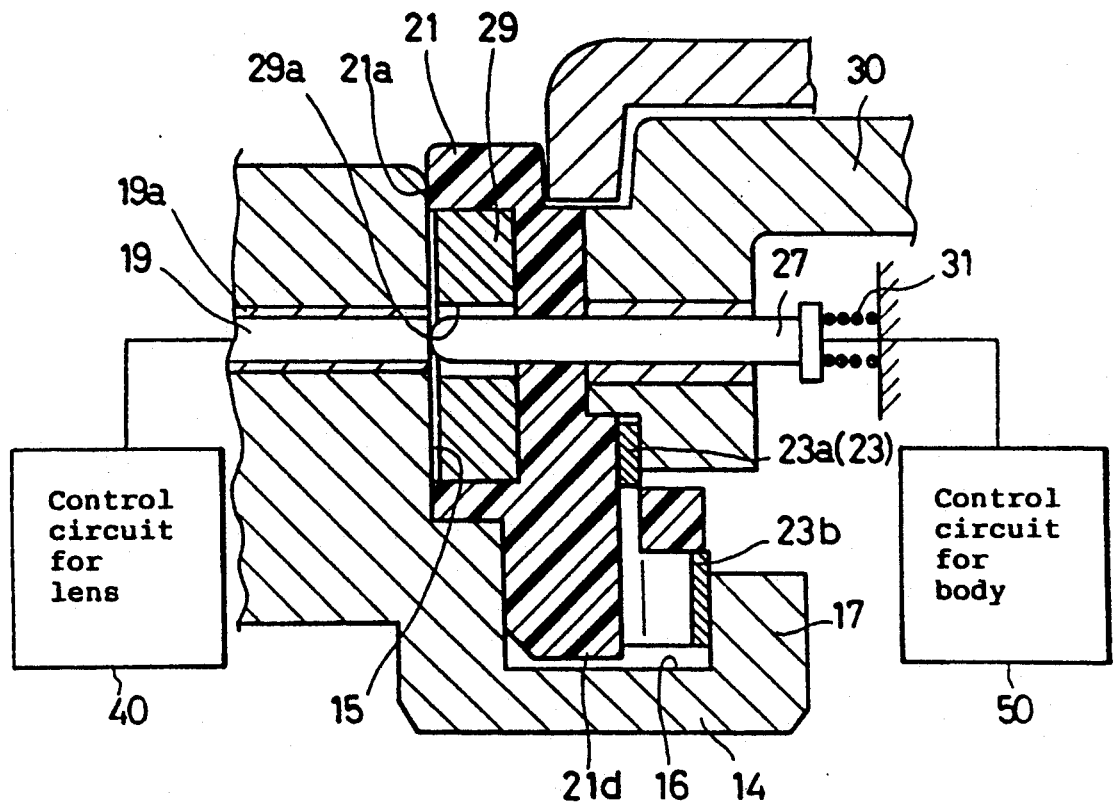

The grounding pin 26 and the contact pin 27 are biased by a spring means 31 in a direction so as to project from the mount surface 21a. Since the insertion hole 22a of the reinforcing ring member 22 does not come into contact with the contact pin 27, as mentioned above, the mount member 20 does not require a special insulating means for the contact pin 27. The camera body 30 is, however, provided with an insulating means for the contact pin 27, as shown in the embodiment of FIG. 8.

On the interchangeable lens 12 are provided a grounding pin 18 and a contact pin 19 which are connected to the grounding pin 26 and the contact pin 27 of the camera body 11, respectively. The grounding pin 18 and the contact pin 19 are insulated from the lens mount 14 by respective insulating members 18a and 19a and electrically connected to a control circuit 40 on the lens side. The grounding pin 26 and the contact pin 27 are connected to a control circuit 50 on the camera body side.

In the mount member 20 as constructed above, according to the present invention, the mount body, having a complex contour, can be easily and inexpensively injection-molded. Furthermore, the reinforcing ring member 22 has a simple shape, and, accordingly, can be inexpensively made of metal. Consequently, as a whole, the manufacturing cost can be remarkably reduced, while ensuring necessary strength and precision.

Since the mount surface 21a is made of synthetic resin, no sound is made during the sliding contact of the mount surfaces 21a and 15. In particular, since the engineering plastic has a high strength is highly corrosion proof, and highly wear proof, there is no change in the friction characteristics despite repeated attachment and detachment.

Figure 6:
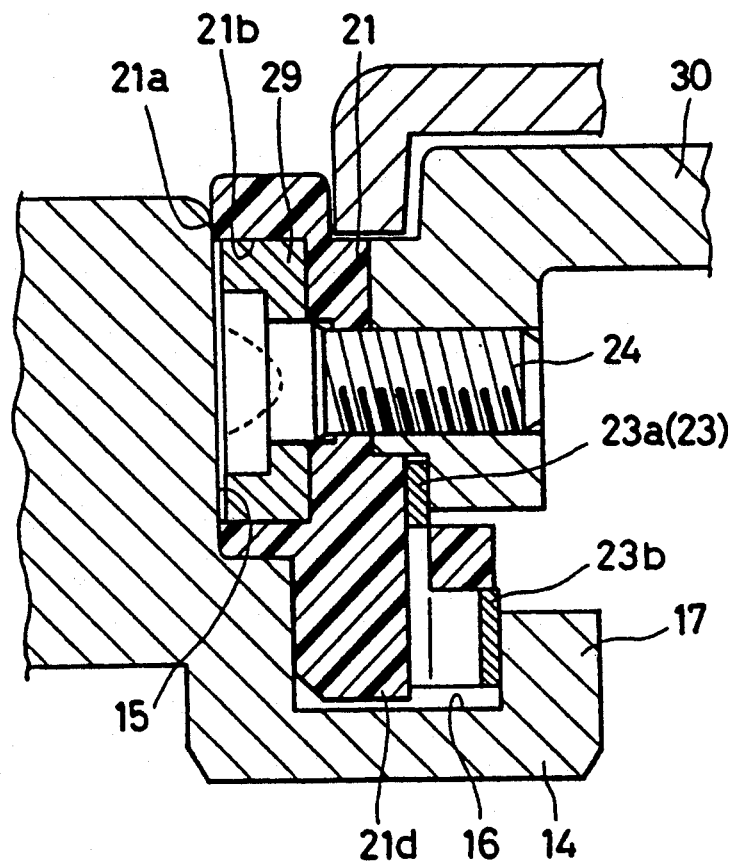
FIGS. 6, 7 and 8 are sectional views corresponding to FIGS. 2, 3 and 4, according to another aspect of the present invention, respectively; and, FIG. 9 is a perspective view of an interchangeable lens which can be mounted to a body mount of a camera body, according to the present invention.
Figure 7:
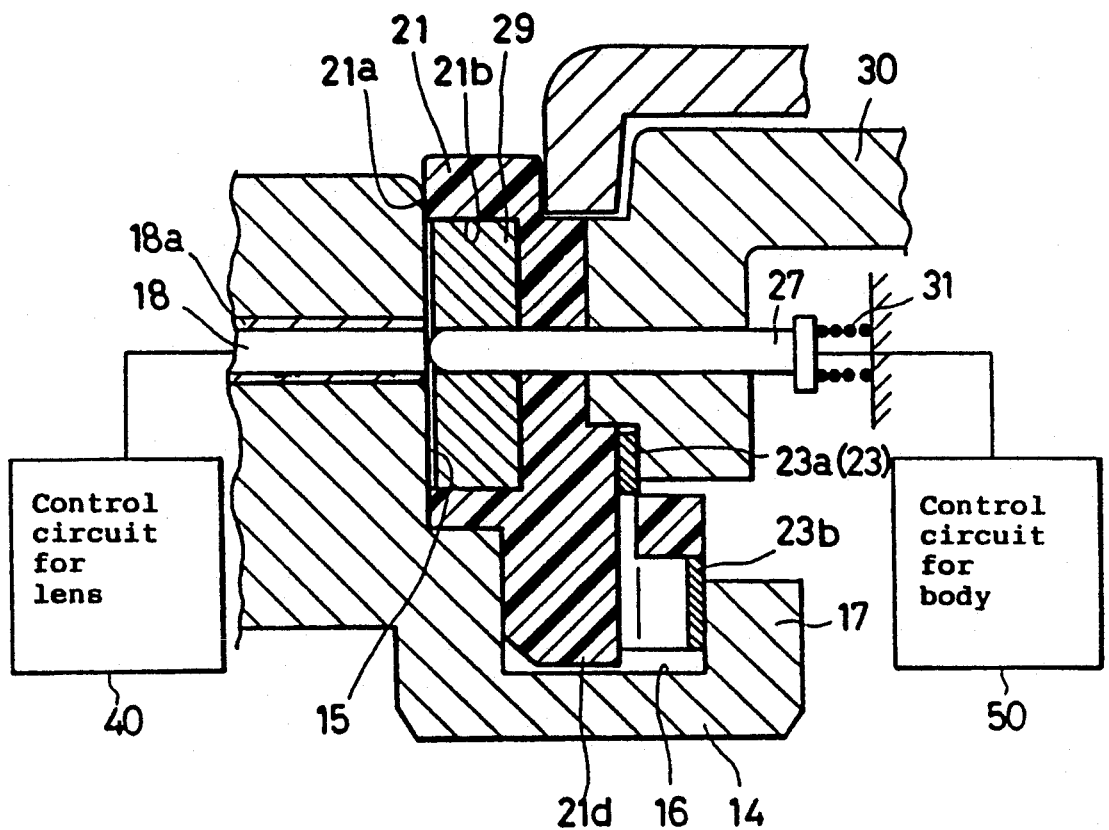

FIGS. 6 through 8 show a second embodiment of the present invention. In this embodiment, the reinforcing ring member 22 in the first embodiment mentioned above, which is embedded in the mount body 21, is replaced with a fastening type of reinforcing ring member 29 which is embedded in the mount body by being fitted in an annular groove (counter bore) 21b which is formed on the mount surface 21a of the mount body 21. The surface of the reinforcing ring member 29 is slightly retracted from the mount surface 21a so as not to come into contact with the lens mount surface 15. In the illustrated embodiment, the reinforcing ring member 29 is provided with insertion holes similar to the reinforcing ring member 22. The insertion hole for the contact pin 27 is in the form of a through hole 29a in which the contact pin 27 is loosely inserted without coming into contact therewith. The reinforcing ring member 29 is inserted in the counterbore 21b and secured to the camera body 30 together with the mount body 21.

Figure 1:
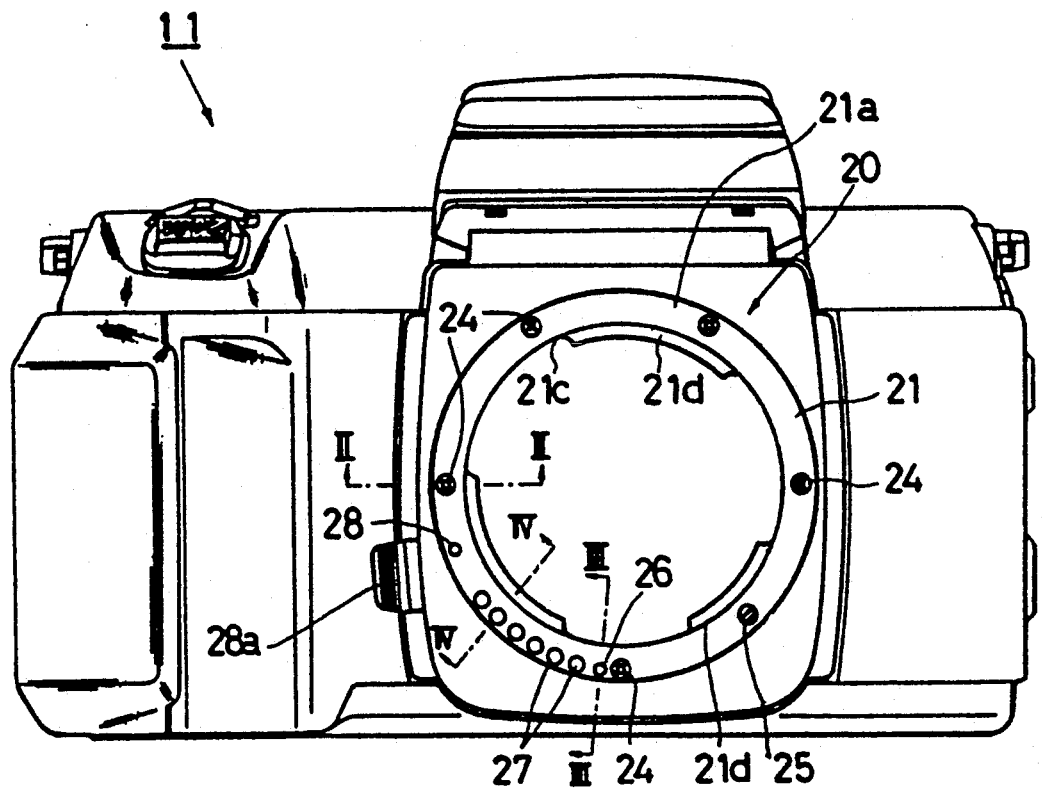
FIG. 1 is a front elevational view of a camera having a camera body to which a mount is attached according to an aspect of the present invention.
Figure 2:
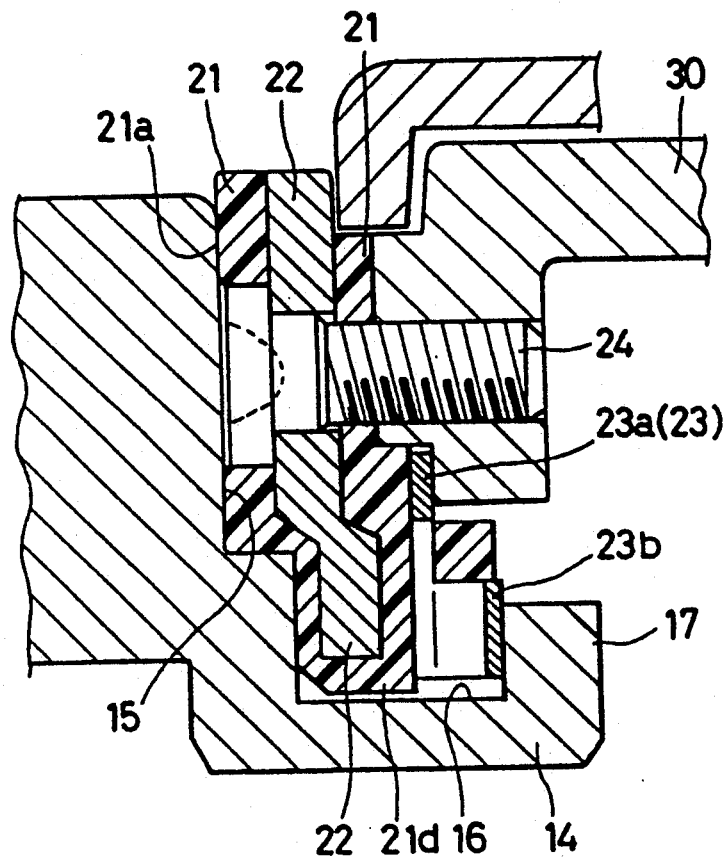
FIGS. 2, 3 and 4 are sectional views taken along the lines II—II, III—III and IV—IV in FIG. 1, respectively.
Figure 3:
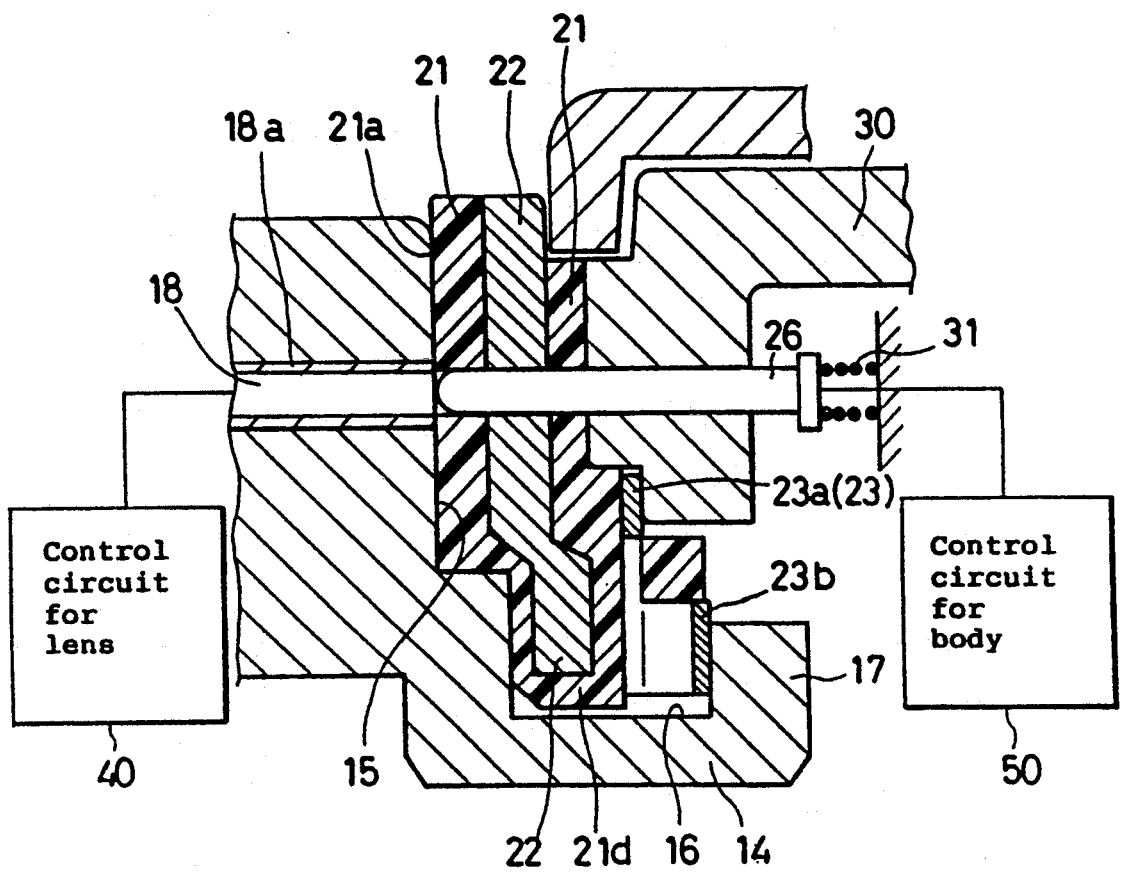
Figure 4:
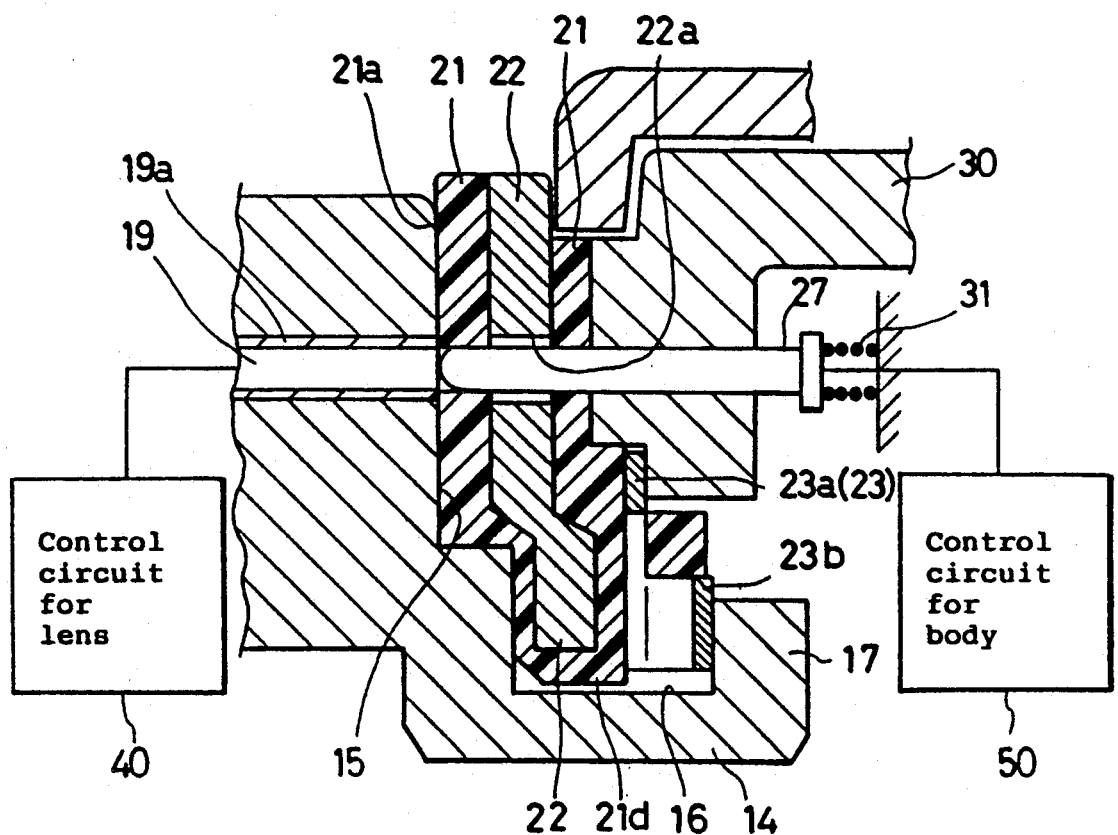

The AF joint 25 is adapted to give, for example, a focusing drive force to the interchangeable lens side from the camera body side. The lock pin 28 is engaged in an associated locking hole of the interchangeable lens 12 to lock and unlock the engagement. The lock pin 28 is biased in a direction to project from the mount surface 21a and can be retracted therefrom against the biasing force by an attachment and detachment operation lever 28a (FIG. 1). The control circuits 40 and 50 on the lens side and the camera body side are interconnected by the contact pins 27 and 19 and the grounding pins 26 and 18 to transmit necessary information therebetween, respectively.

The illustrated embodiments mentioned above are applied to a mount member which has a grounding pin 26 and a contact pin 27 on a mount surface 21a for transmitting signals, the contact pin 27 being easily insulated. But the present invention can be advantageously applied to a mount member which has no grounding pin 26 and no contact pin 27.

We claim:

1. A mount assembly comprising:

a pair of mounts which are provided on optical devices to be detachably attached to each other, said mounts having mount surfaces which are adapted to come into contact with each other when the optical devices are attached to each other through the mounts, wherein at least one of the mounts comprises a molded synthetic resin mount body which is reinforced with a metal ring member, said molded synthetic resin mount body being provided with one of said mount surfaces, and wherein said metal ring is embedded in said molded synthetic resin mount body so that said metal reinforcing ring does not come into contact with the other of said mounts.

2. A mount assembly according to claim 1, wherein said at least one of the mounts is secured to one of said associated optical devices by set screws.

3. A mount assembly according to claim 2, wherein said metal ring member comes into direct contact with the heads of the associated set screws.

4. A mount assembly according to claim 1, wherein said metal ring member is made as a separate piece from said mount body and is secured to the associated optical device together with said mount body by set screws.

5. A mount assembly according to claim 1, wherein said one of said mounts is provided with a contact pin adjacent the surface of said one mount, said pin having no contact with said reinforcing metal ring member.

6. A mount assembly according to claim 1, wherein the other of said pair of mounts is made of metal.

7. A mount assembly according to claim 1, wherein said synthetic resin is selected from the group consisting of polyphenylenesulfite, liquid crystal polymer, self-lubricating resin and oil-impregnated resin.

8. A mount assembly according to claim 1, wherein one of said optical devices is a camera body and the other of said optical devices is an interchangeable lens.

9. A camera system comprising:

a camera body having a female mount; and an interchangeable lens having a male mount which is adapted to be engaged by said female mount of said camera body, wherein at least one of the male and female mounts comprises a molded synthetic resin mount body which comes into contact with the other of said mounts, and a reinforcing metal ring member for reinforcing said molded synthetic resin mount body, wherein said reinforcing metal ring member does not come into contact with the other of said male and female mounts.

10. A camera system according to claim 9, wherein said male mount of said interchangeable lens is made of metal.

* * * * *

UNITED STATES PATENT AND TRADEMARK OFFICE
CERTIFICATE OF CORRECTION

PATENT NO. : 5,274,413
DATED : December 28, 1993
INVENTOR(S) : K. Nomura et al

It is certified that error appears in the above-indentified patent and that said Letters Patent is hereby corrected as shown below:

On the title page, section [56] References Cited, under "FOREIGN PATENT DOCUMENTS", insert the following items:
-- Document    Date    Country
   2230132     9/90    Japan
   60-106767   6/85    Japan
   63-127834   5/88    Japan--.

Under "OTHER PUBLICATIONS", insert the following: --Patent Abstracts of Japan. Vol. 14, No. 538, (P-1136), November 28, 1990.--;
--Patent Abstracts of Japan. Vol. 9, No. 256, (M-421), October 15, 1985.--;
--Patent Abstracts of Japan, Vol. 12, No. 376, (M-750), October 7, 1988.--.

In the drawings, in Fig. 7, reference numeral "27" should be changed to --26--.

Signed and Sealed this

Eleventh Day of October, 1994

*Attest:*

BRUCE LEHMAN

*Attesting Officer*     *Commissioner of Patents and Trademarks*